United States Patent [19]
Nakakubo et al.

[11] Patent Number: 5,630,768
[45] Date of Patent: May 20, 1997

[54] TENSIONER WITH SPRING HAVING NONLINEAR CHARACTERISTICS

[75] Inventors: Katsuya Nakakubo, Iruma; Toru Fujiwara, Tokorozawa, both of Japan

[73] Assignee: Tsubakimoto Chain Co., Osaka, Japan

[21] Appl. No.: 692,646

[22] Filed: Aug. 6, 1996

Related U.S. Application Data

[63] Continuation of Ser. No. 446,516, May 22, 1995, abandoned.

[30] Foreign Application Priority Data

May 23, 1994 [JP] Japan .................................. 6-130878

[51] Int. Cl.⁶ ..................................................... F16H 7/10
[52] U.S. Cl. ............................................. 474/112; 474/135
[58] Field of Search ........................... 474/104, 109–112, 474/135, 138

[56] References Cited

U.S. PATENT DOCUMENTS

| | | | |
|---|---|---|---|
| 3,673,884 | 7/1972 | Southiere | 474/111 |
| 4,708,696 | 11/1987 | Kimura et al. | 474/103 |
| 4,904,230 | 2/1990 | Kawashima et al. | 474/112 |
| 4,940,447 | 7/1990 | Kawashima et al. | 474/138 X |
| 4,976,661 | 12/1990 | Ojima | 474/138 |
| 5,021,032 | 6/1991 | MacChiarulo et al. | 474/138 |
| 5,037,357 | 8/1991 | Ojima | 474/138 X |
| 5,073,158 | 12/1991 | Ojima | 474/138 |
| 5,181,889 | 1/1993 | Maruyama et al. | 474/110 |

*Primary Examiner*—Roger J. Schoeppel
*Attorney, Agent, or Firm*—Armstrong, Westerman, Hattori, McLeland & Naughton

[57] ABSTRACT

A tensioner includes a plunger slidably inserted in a housing and biased by spring means. The spring means include sequentially operable first and second portions in which the first portion has a relatively larger pitch and large spring modulus and the second portion has a relatively small pitch and small spring modulus. When the spring means is depressed a certain degree, the coils of the second spring portion 16 will move into close contact with each other to vary the spring modulus. Thus, the amount of backward movement and jutting out speed of the plunger will be decreased, thereby a required tensile force will be given to a belt, or the like, without delay.

4 Claims, 8 Drawing Sheets

TENSIONER WITH SPRING HAVING NONLINEAR CHARACTERISTICS

This application is a continuation of application Ser. No. 08/446,516 filed May 22, 1995, now abandoned.

BACKGROUND OF THE INVENTION

This invention relates to a tensioner adapted for giving tensile force to a toothed belt or a chain for driving a cam shaft of an engine, or relates to a tensioner adapted for giving tensile force to a belt or a chain for driving a sub-machine.

As shown in FIG. 9, prior tensioner 60 comprises a housing 62, a plunger 68 which divides the housing 62 into a low-pressure chamber 64 and a high-pressure chamber 66, and a spring 70 which urges the plunger 68 frontward (in a right direction as viewed in FIG. 9). The numeral 72 denotes a check valve. The plunger 68 contacts, for instance, an arm with an idler roller (not shown). In this kind of tensioner 60, the plunger 68 slowly moves backward (in a left direction as viewed in FIG. 9) when an oil flow from the high-pressure chamber 66 to the low-pressure chamber 64 is restricted. On the other hand, the plunger 68 quickly juts out when an oil flow from the low-pressure chamber 64 to the high-pressure chamber 66 is not substantially restricted.

The spring 70 used in the tensioner 60 is an equal pitch spring or a twisted coil spring. The spring has usually a linear characteristic. A tensioner should act to suppress a scattering of the initial tension of the toothed belt or the chain (herein after referred to as 'belt, or the like'). Therefore, a spring having a small modulus is often used.

Using a spring having a linear characteristic will cause such problems as slipping of a belt, or the like, or making noise when an engine starts. The tensioner is usually placed on a looser side of the belt, or the like. A tension of the belt, or the like, at the looser side thereof while an engine is in operation sometimes becomes greater than that while an engine is at rest. Therefore, the plunger takes more backward position while an engine is at rest than while an engine is in operation. Under such condition, a required tension will not be given to the belt, or the like, when an engine starts, thereby causing slipping of the belt, or the like, or making a noise.

By using a spring having a small modulus, an amount of backward movement of the plunger will be large when an engine stops. An oil flow resistance is proportional to the jutting out speed of the plunger. Therefore, if an amount of the backward movement of the plunger is large, the belt, or the like, will slip until a required tension is given thereto.

The same problems of this kind will arise in a swing type tensioner as disclosed in Japanese Patent Application Laid-open Nos. Hei 2-66356 and 2-72252. A tensioner of this kind includes a cam swingingly connected to a fixed shaft. The cam is given a rotating force toward the direction at which a tension of a toothed belt or a chain increases.

Thus, it is an object of the present invention to provide a tensioner with a spring wherein tensile force is given to a toothed belt or a chain, and wherein slipping of the belt, or the like, is restricted by using a spring having a nonlinear characteristic.

SUMMARY OF THE INVENTION

In the first mode of the present invention, the above problems are solved by the tensioner including a housing and a plunger slidably fitted in the housing and urged frontward by a spring, wherein said spring has a nonlinear characteristic.

In a second mode of the present invention, the above problems are solved by the tensioner with a cam swingingly secured to a fixed shaft and rotatably urged by a spring, wherein the spring has a nonlinear characteristic.

In the first mode of the present invention, a spring force increases in accordance with an amount of backward movement of a plunger with a spring having a nonlinear characteristic. In a tensioner according to the present invention, an amount of backward movement of the plunger becomes smaller than that in a tensioner with a spring having a linear characteristic, even if tensile force of a belt, or the like, at a looser side thereof increases to force a plunger backward when an engine stops.

When an engine starts and tensile force of the belt, or the like, at looser side thereof decreases, a plunger juts out. However, the amount of the jut out movement of the plunger is small, thereby decreasing jutting out speed of the plunger. Thus, flow resistance of an oil will decrease, thereby shortening the time for giving a required tensile force to the belt, or the like.

A similar function as mentioned above will be applied to the second mode of the invention. That is, by using a spring having a nonlinear characteristic, the spring force will increase in accordance with the rotational amount of the cam. In a tensioner according to the present invention, the rotational amount of the cam is smaller than that in a tensioner with a spring having a linear characteristic when an engine stops and tensile force of a belt, or the like, at a looser side thereof increases to rotate the cam.

When an engine starts and tensile force of the belt, or the like, at the looser side thereof decreases, the plunger rotates. As the rotational amount of the cam is small, the rotational speed becomes slow. Therefore, flow resistance of an oil will decrease, thereby shortening the time for giving a required tensile force to the belt, or the like.

DETAILED DESCRIPTION OF THE PREFERRED EMBODIMENT

Preferred embodiments of the present invention will now be described, in detail, with reference to the accompanying drawings.

Figure 1:
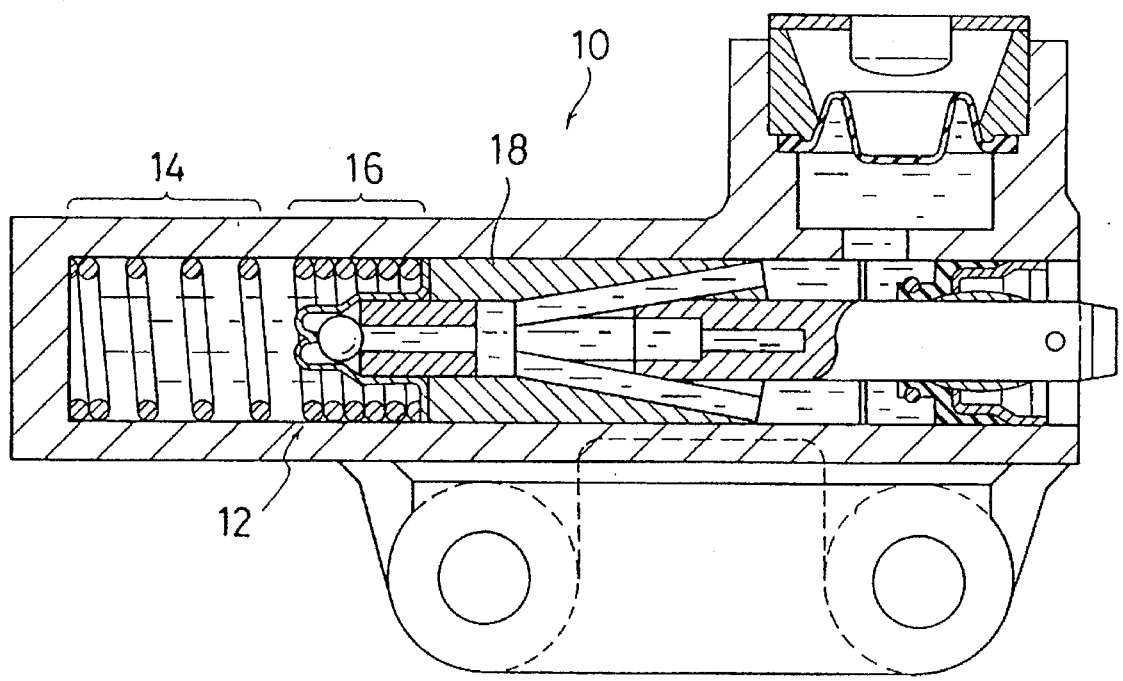
FIG. 1 was a sectional view of the first embodiment of the tensioner according to the present invention.
Figure 9:
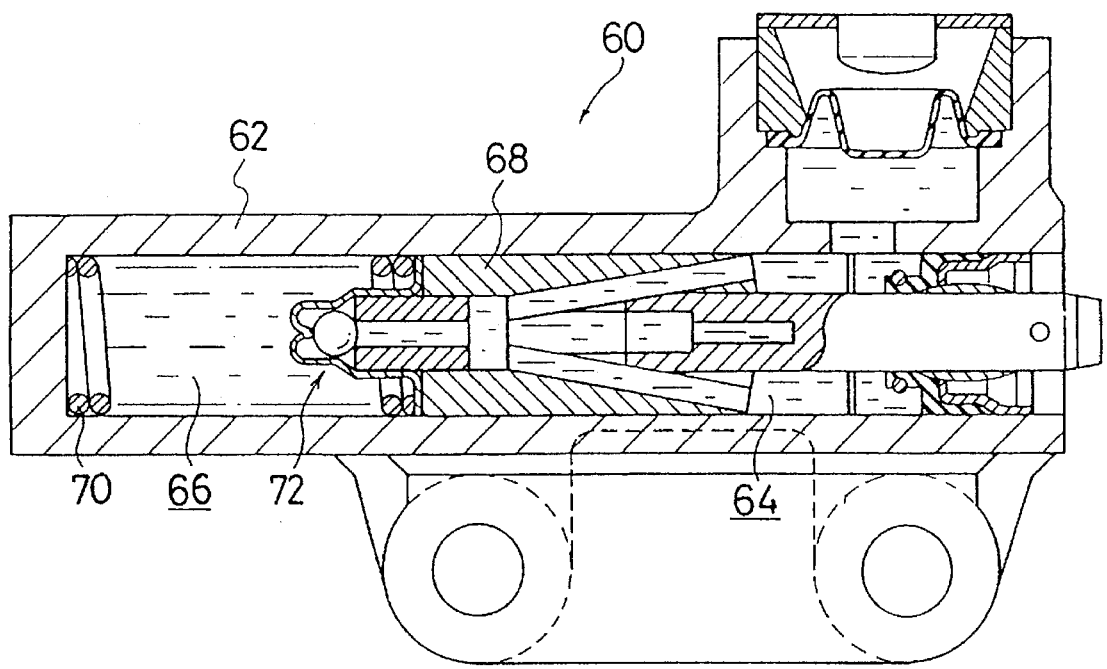
FIG. 9 shows a sectional view of a conventional tensioner.

FIG. 1 shows a first embodiment of a tensioner according to the present invention. A fundamental structure of the tensioner 10 is essentially same as that of a conventional tensioner as shown in FIG. 9. The feature of the present invention will be described below.

Figure 2:
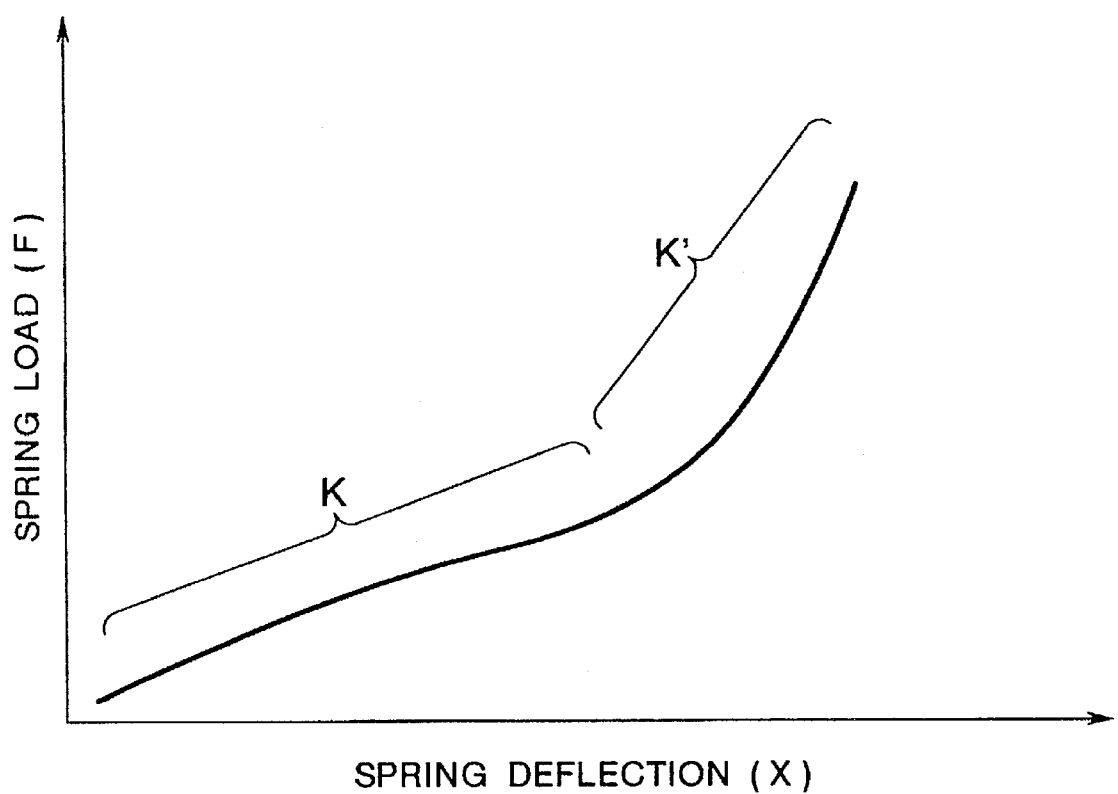
FIG. 2 shows a graph showing spring characteristic shown in FIG. 1.

As shown in FIG. 1, a spring 12 comprises a first portion 14 having a relatively large pitch and large spring modulus and a second portion 16 having a relatively small pitch and small spring modulus. FIG. 2 shows a characteristic of the spring. When a deflection of the spring 12, that is an amount of the backward movement of the plunger 18, becomes a certain degree, its spring modulus (dF/dx) changes from k to k', wherein k' is larger than k (k<k').

The reason is as follows. When the plunger 18 moves backward a certain distance, the coils of the second portion 16 of the spring 12 move into close contact with each other, thereby the spring modulus of the spring as a whole will be controlled by the first portion 14 of the spring.

Before the coils of the second portion 16 moves into close contact with each other, the spring modulus "k" of the spring as a whole will be described as follows, wherein the spring modulus of the first portion 14 and that of the second portion 16 are indicated as "k1" and "k2", respectively.

$$k = k1 \times k2/(k1+k2)$$

The above equation shows that a spring having a nonlinear characteristic should meet the condition of k<k2. The spring modulus k' as a whole after the soil of the second portion 16 move into close contact with each other is k2.

Figure 3:
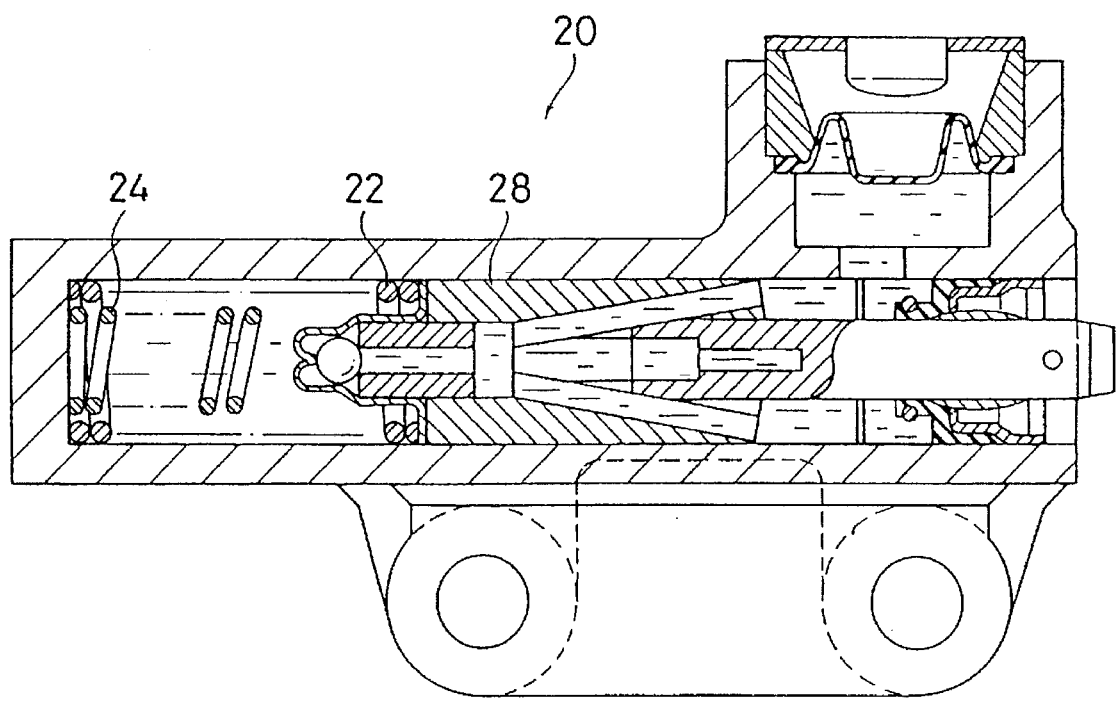
FIGS. 3 shows a sectional view of the second embodiment of the tensioner according to the present invention.

FIG. 3 shows a second embodiment of a tensioner according to the present invention. A tensioner 20 in this embodiment includes two springs, an outer spring 22 and an inner spring 24. The inner spring 24 is shorter than the outer spring 22. The spring modulus of the inner spring 24 is larger than that of the outer spring 22. Alternatively, an outer spring may be shorter than an inner spring and the spring modulus of the outer spring may be larger than that of the inner spring.

Until the plunger 28 moves backward at a given distance, the outer spring 22 gives a spring force to the plunger 28. If the plunger 28 further moves backward, both the outer spring 22 and the inner spring 24 gives a cummulative spring force to the plunger 28. Thus, utilizing two springs 22, 24 different in spring modulus and length makes a spring characteristic nonlinear.

A tensioner with a volute spring having a nonlinear characteristic in itself will cause the same function and results as in the above mentioned embodiment.

Figure 4:
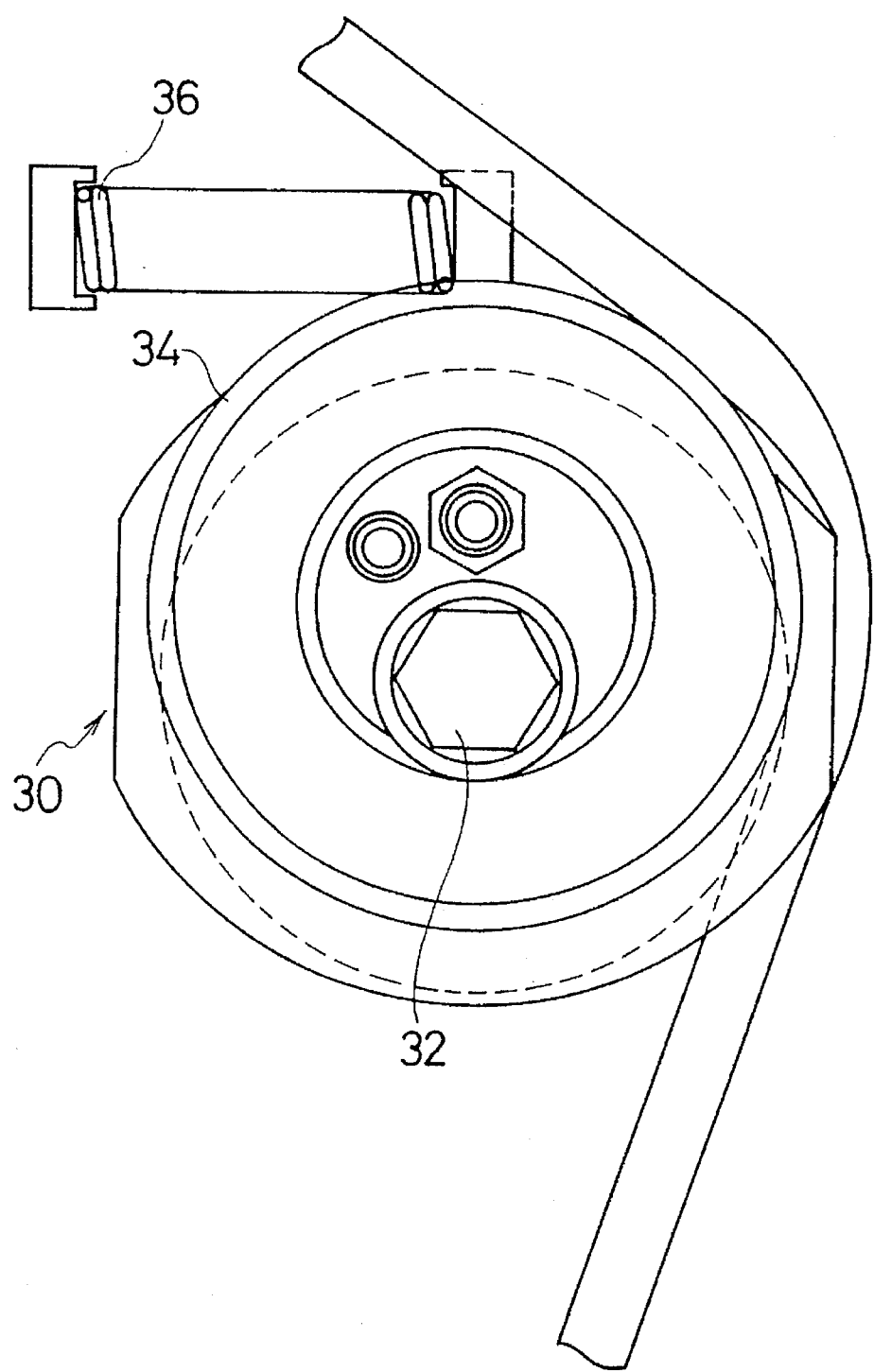
FIG. 4 shows a front view of the third embodiment of the tensioner according to the present invention.
Figure 5:
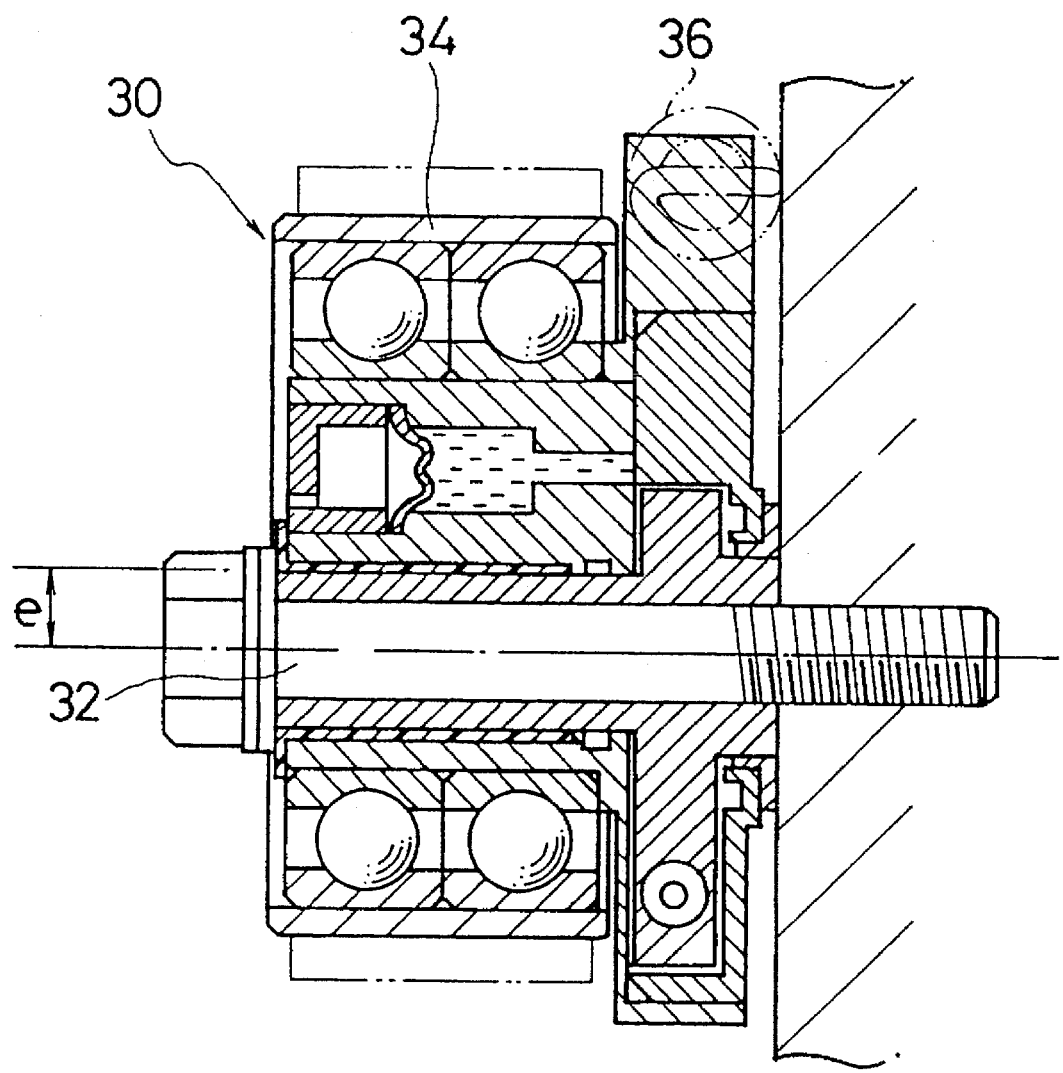
FIG. 5 shows a sectional view of the tensioner shown in FIG. 4.

FIGS. 4 and 5 show a third embodiment of a tensioner according to the present invention. A tensioner 30 in this embodiment includes a cam 34 swingingly mounted on a fixed axis 32 and urged a rotational force clockwise by a spring 36. The present invention can also be applied to this kind of tensioner 30. The tensioner 30 with the spring 36 having a nonlinear characteristic will obtain the same results as in the first embodiment.

In the tensioner 30, if the spring 36 comprises two or more portions different in pitch and spring modulus as shown in FIG. 1, rotation of the tensioner 30, exceeding a given degree, will cause the spring modulus, as a whole, to change. Alternatively, an outer spring and an inner spring as shown in FIG. 3, may be provided as the spring 36, so that rotation of the tensioner 30, exceeding a given degree, will cause the spring modulus, as a whole, to change.

Figure 6:
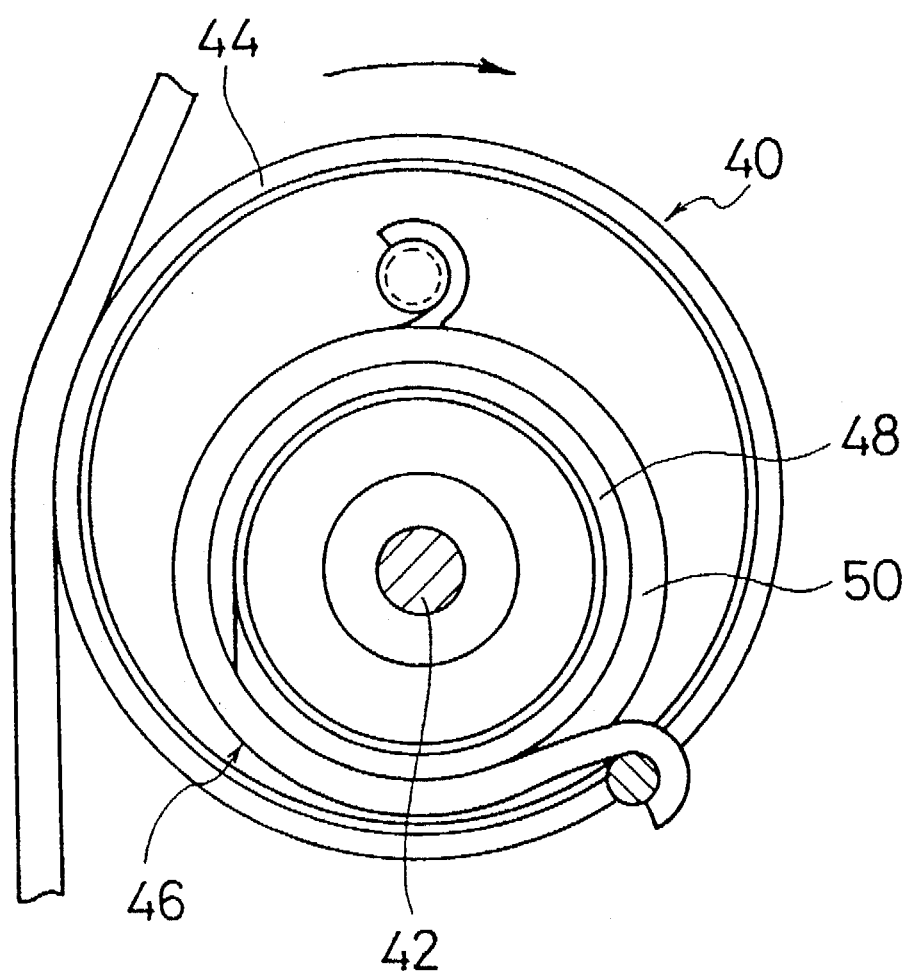
FIG. 6 shows a front view of the fourth embodiment of the tensioner according to the present invention.
Figure 7:
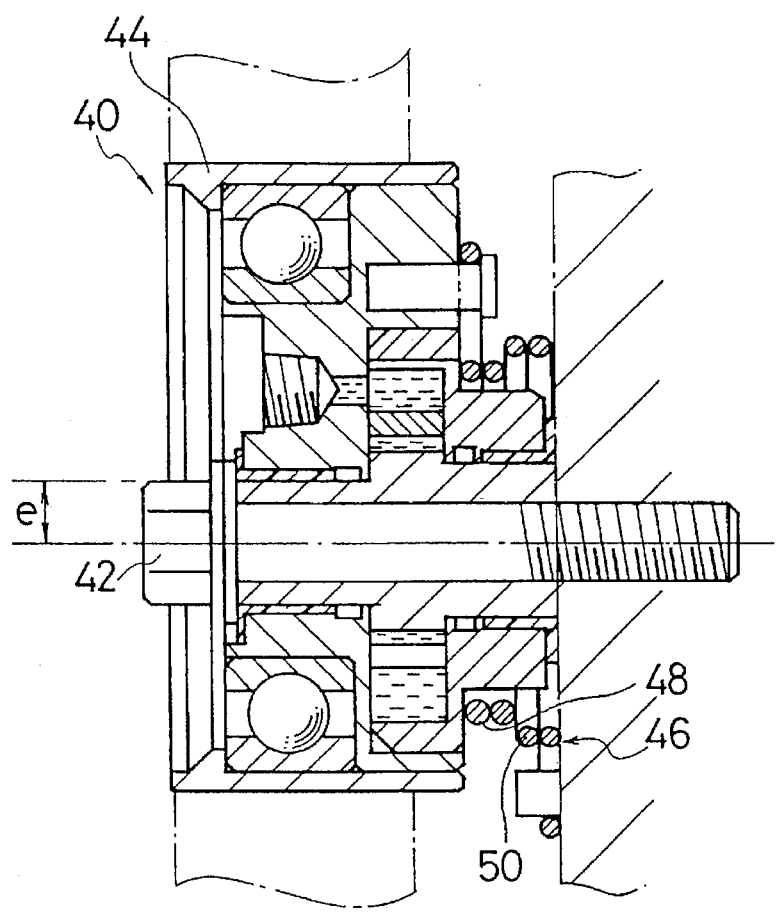
FIG. 7 shows a sectional view of the tensioner shown in FIG. 6.
Figure 8:
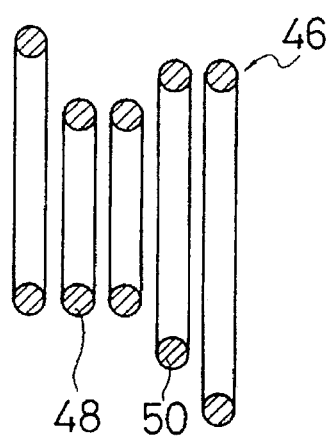
FIG. 8 shows a front view of the spring used in the tensioner shown in FIG. 6.

FIGS. 6 and 7 show a fourth embodiment of a tensioner according to the present invention. A tensioner 40 in this embodiment includes a cam 44 swingingly mounted on a fixed axis 42 and urged a rotational force clockwise by a spring 46. In the tensioner 40, if the spring 46 comprises two or more portions 48, 50 different in diameter as shown in FIG. 8, rotation of the tensioner 40, exceeding a given degree, will cause the spring modulus, as a whole, to change.

In FIG. 6, diameter of the spring 46 decreases when the cam 44 rotates in the direction of the arrow shown in the figure. The smaller diameter portion 48 of the spring 46, which is slightly larger than the outer diameter of the cam 44 on the fixed axis 42, will be fitted on the cam 44 on the fixed axis 42, thereby the spring function thereof will be lost. As a result, the spring modulus, as a whole, will be controlled by the larger diameter portion 50, thereby the spring 46 acts as a nonlinear spring.

Utilizing a spring having a nonlinear characteristic can decrease an amount of the backward movement of the plunger when an engine stops, thereby the jutting out speed of the plunger will also be decreased. Such decreased jutting out speed of the plunger will cause flow resistance of the oil to decrease. As mentioned above, backward movement of the plunger, jutting out speed of the plunger and flow resistance of the oil is decreased, respectively, therefore time for giving a required tensile force to the belt, or the like, can be decreased, thereby decreasing slipping of the belt, or the like, and reducing a noise.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A tensioner, comprising:

a cam swingingly secured to a fixed axis, said cam being rotatably urged by a spring, wherein said spring has a nonlinear characteristic.

2. A tensioner as recited in claim 1 wherein said spring comprises two portions different in diameter, said spring being provided around said fixed axis.

3. A tensioner, comprising:

a fixed shaft;

a cam swingingly mounted on said fixed shaft; and means for urging said cam, wherein said urging means is a coil spring surrounding said cam, said coil spring having a smaller diameter portion and a larger diameter portion, thereby said spring acting as a nonlinear spring.

4. A tensioner as recited in claim 3 wherein said smaller diameter portion of said coil spring is slightly larger than the outer diameter of said cam so as to fit on the surface of said cam when said cam swings.

* * * * *